United States Patent
Nakata

(10) Patent No.: US 9,100,945 B2
(45) Date of Patent: Aug. 4, 2015

(54) COMMUNICATION NODE APPARATUS, COMMUNICATION SYSTEM, AND METHOD FOR SELECTING DESTINATION RECEPTION INTERFACE USED THEREFOR

(75) Inventor: Tsuneo Nakata, Tokyo (JP)

(73) Assignee: NEC Corporation, Tokyo (JP)

( * ) Notice: Subject to any disclaimer, the term of this patent is extended or adjusted under 35 U.S.C. 154(b) by 150 days.

(21) Appl. No.: 13/634,100

(22) PCT Filed: Mar. 7, 2011

(86) PCT No.: PCT/JP2011/001325
§ 371 (c)(1), (2), (4) Date: Sep. 11, 2012

(87) PCT Pub. No.: WO2011/114650
PCT Pub. Date: Sep. 22, 2011

(65) Prior Publication Data
US 2013/0003744 A1   Jan. 3, 2013

(30) Foreign Application Priority Data
Mar. 17, 2010   (JP) .................................. 2010-060053

(51) Int. Cl.
*H04W 4/00* (2009.01)
*H04W 76/02* (2009.01)
(Continued)

(52) U.S. Cl.
CPC .......... *H04W 76/025* (2013.01); *H04L 47/762* (2013.01); *H04W 40/12* (2013.01); *H04L 43/0835* (2013.01); *H04L 45/24* (2013.01); *H04L 47/822* (2013.01); *H04W 72/08* (2013.01); *H04W 72/1263* (2013.01)

(58) Field of Classification Search
None
See application file for complete search history.

(56) References Cited

U.S. PATENT DOCUMENTS

| 8,098,648 B2 | 1/2012 | Nakata et al. |
| 2006/0182128 A1 | 8/2006 | Nakata et al. |

(Continued)

FOREIGN PATENT DOCUMENTS

| CN | 101119314 A | 2/2008 |
| JP | 4000479 B2 | 10/2007 |

(Continued)

OTHER PUBLICATIONS

Office Action mailed Feb. 28, 2015 in related Chinese application No. 201180014369.2 with English-language translation (14 pgs.).

*Primary Examiner* — Bob Phunkulh
(74) *Attorney, Agent, or Firm* — Foley & Lardner LLP

(57) ABSTRACT

Provided is a communication node apparatus that can attempt optimal utilization of a communication resource of a communication interface mounted on each node apparatus. A communication node apparatus (transmission node apparatus 101) includes a plurality communication interfaces (transmission interfaces 201-1 and 201-2 and reception interfaces 202-1 and 202-2), enables communication that uses a plurality of communication paths with an opposing apparatus, and includes a means (reception interface aggregate calculation unit 204) for changing an aggregation of reception interfaces addressable as destinations for data to be transferred to the opposing apparatus via each of the plurality of transmission interfaces so as to maximize the communication performance using the plurality of communication paths simultaneously in response to a change in communication performance of each of the transmission interface and the reception interface.

8 Claims, 7 Drawing Sheets

(51) Int. Cl.
  *H04W 40/12*   (2009.01)
  *H04L 12/923*  (2013.01)
  *H04W 72/08*       (2009.01)
  *H04W 72/12*       (2009.01)
  *H04L 12/26*       (2006.01)
  *H04L 12/707*      (2013.01)
  *H04L 12/911*      (2013.01)

(56) References Cited

U.S. PATENT DOCUMENTS

| | | | |
|---|---|---|---|
| 2007/0097877 A1 | 5/2007 | Hoekstra et al. | |
| 2009/0028262 A1* | 1/2009 | Imai et al. | 375/267 |
| 2009/0233559 A1* | 9/2009 | Guey et al. | 455/69 |
| 2010/0054374 A1* | 3/2010 | Larsson et al. | 375/341 |
| 2010/0080317 A1* | 4/2010 | Narasimhan et al. | 375/267 |
| 2010/0098135 A1* | 4/2010 | Eitan | 375/141 |
| 2010/0157861 A1* | 6/2010 | Na et al. | 370/310 |
| 2010/0238897 A1* | 9/2010 | Kiribayashi | 370/331 |
| 2010/0296608 A1* | 11/2010 | Axnas | 375/320 |

FOREIGN PATENT DOCUMENTS

| | | |
|---|---|---|
| JP | 2009-515433 A | 4/2009 |
| JP | 4396859 B2 | 1/2010 |
| KR | 10-2009-0071820 A | 7/2009 |
| WO | WO 2005/067227 A1 | 7/2005 |

\* cited by examiner

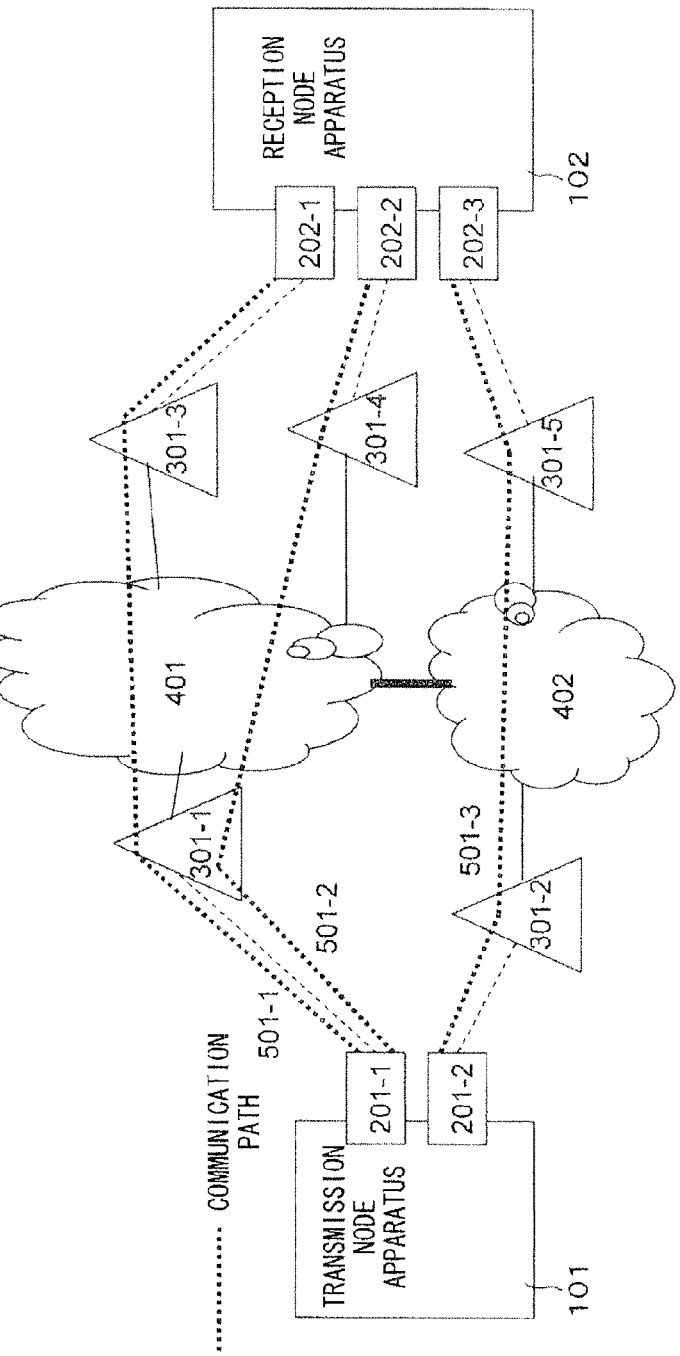

COMMUNICATION NODE APPARATUS, COMMUNICATION SYSTEM, AND METHOD FOR SELECTING DESTINATION RECEPTION INTERFACE USED THEREFOR

This application is the National Phase of PCT/JP2011/001325, filed Mar. 7, 2011, which claims priority to Japanese Application No. 2010-060053, filed Mar. 17, 2010, the disclosures of which are hereby incorporated by reference in their entirety.

TECHNICAL FIELD

The present invention relates to communication node apparatus, a communication system, and a method for selecting a destination reception interface used therefor, and particularly to a communication node apparatus including a plurality of interfaces.

BACKGROUND ART

As a mechanism to multiplex a plurality of communication paths between a transmission node and a reception node, there are systems disclosed in PTLs 1 and 2. The performance of a multiplexed path in the systems disclosed in PTLs 1 and 2 depends on the performance of each path to be multiplexed.

Especially, in a wireless environment, since the performance of each path dynamically fluctuates, the technique disclosed in PTLs 1 and 2 monitors communication performance of the path and provides an appropriate load to each path according to the monitor result, and thereby efficiently utilizing the communication resource while avoiding jitter that is due to a difference in delay between paths.

CITATION LIST

Patent Literature

PTL 1: Japanese Patent No. 4396859
PTL 2: Japanese Patent No. 4000479

SUMMARY INVENTION

Technical Problem

In the systems disclosed in PTLs 1 and 2, the performance of each path fluctuates by an individual communication link that composes the path and resource control of individual traversing network.

Accordingly, although when a link composing the path can be changed, the performance of the path itself can be actively controlled, generally the link composing the path between particular communication interfaces can only be changed by an administrator of the traversing network.

Therefore, the present invention aims to provide a communication node apparatus, a communication system, and a method for determining a destination reception interface used therefor that can solve the above problem and attempt to optimally utilize a communication resource of a communication interface mounted on each node apparatus.

Solution to Problem

A communication node apparatus according to the present invention is a communication node apparatus that includes a plurality of communication interfaces and enables communication using a plurality of communication paths simultaneously with an opposing apparatus, in which the communication node apparatus includes a means for changing an aggregation of reception interfaces addressable as destinations for data to be transferred to the opposing apparatus via each of a plurality of transmission interfaces so as to maximize performance of the communication using the plurality of communication paths simultaneously in response to a change in communication performance of each of the transmission interface and the reception interface.

A communication system according to the present invention is a communication system that each of a transmission node apparatus and a reception node apparatus includes a plurality of communication interfaces and enables communication using a plurality of communication paths between the transmission node apparatus and the reception node apparatus, in which the transmission node apparatus includes a means for changing an aggregation of reception interfaces addressable as destinations for data to be transferred to the reception node apparatus via each of a plurality of transmission interfaces so as to maximize performance of the communication using the plurality of communication paths simultaneously in response to a change in communication performance of each of the transmission interface and the reception interface.

A method for selecting a destination reception interface according to the present invention is a method for selecting the destination reception interface that is used for a communication system in which each of a transmission node apparatus and a reception node apparatus includes a plurality of communication interfaces and enables communication using a plurality of communication paths simultaneously between the transmission node apparatus and the reception node apparatus, in which the method for selecting the destination reception interface includes executing by the transmission node apparatus a process for changing an aggregation of reception interfaces addressable as destinations for data to be transferred to the reception node apparatus via each of the plurality of transmission interfaces so as to maximize performance of the communication using the plurality of communication paths simultaneously in response to a change in communication performance of each of the transmission interface and the reception interface.

Another method for selecting a destination reception interface according to the present invention is a method for selecting the destination reception interface that is used for a communication node apparatus that includes a plurality of communication interfaces and enables communication using a plurality of communication paths simultaneously with an opposing apparatus, in which the method for selecting the destination reception interface includes executing by the communication node apparatus a process for changing an aggregation of reception interfaces addressable as destinations for data to be transferred to the opposing apparatus via each of the plurality of transmission interfaces so as to maximize performance of the communication using the plurality of communication paths simultaneously in response to a change in communication performance of each of the transmission interface and the reception interface.

Advantageous Effects of Invention

By the above configuration and operation, the present invention achieves the effect that can attempt to eptimally utilize the communication resource of the communication interface mounted on each node apparatus.

BRIEF DESCRIPTION OF DRAWINGS

FIG. 7 is a view showing an operation example of a communication system according to a third exemplary embodiment of the present invention.

DESCRIPTION OF EMBODIMENTS

Figure 1:
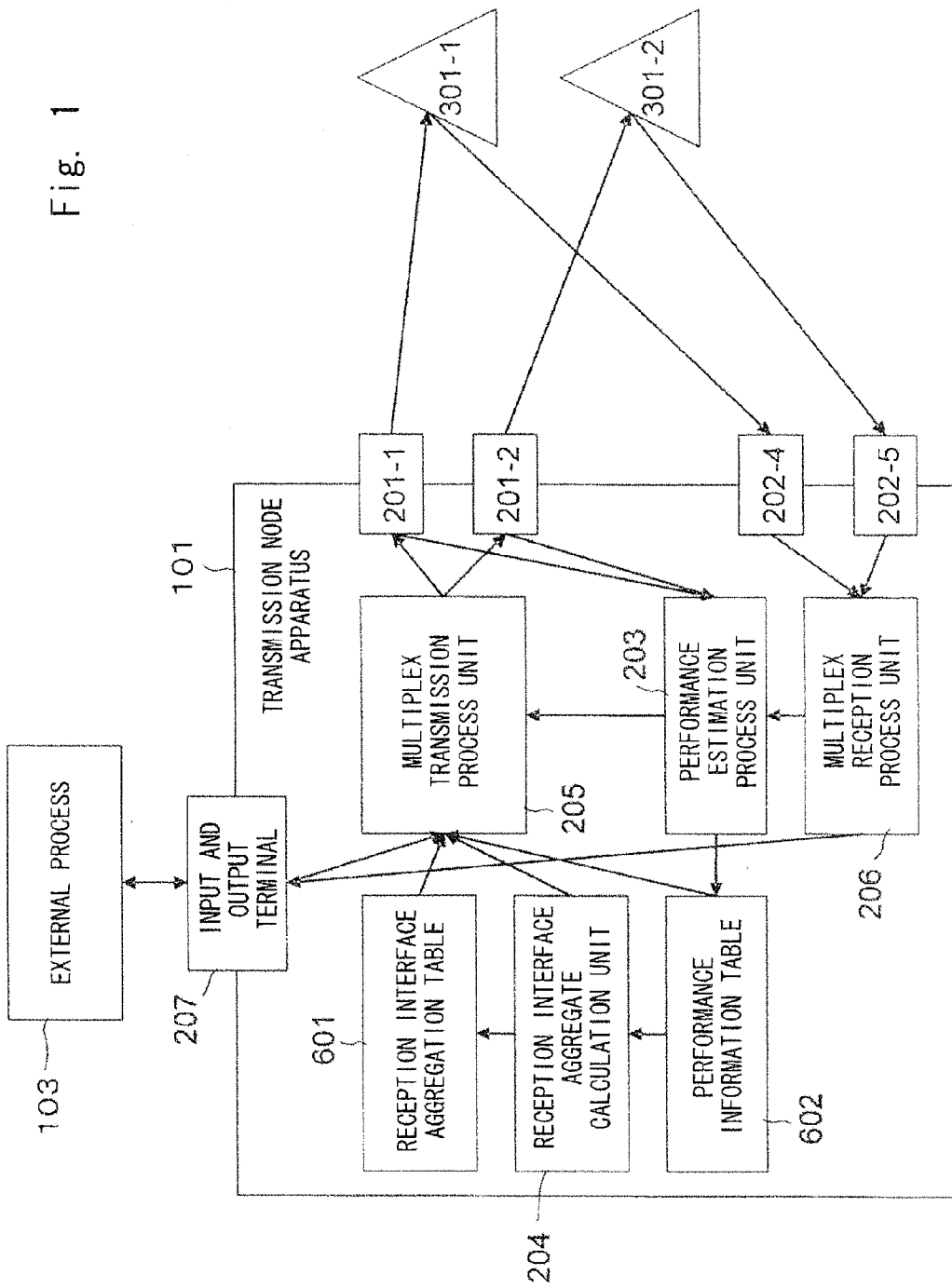
FIG. 1 is a block diagram showing a configuration example of a transmission node apparatus according to a first exemplary embodiment of the present invention.

Next, exemplary embodiments of the present invention are explained with reference to the drawings. First, an overview of the communication system according to the present invention is explained. In the communication system according to the present invention, a transmission node apparatus and a reception node apparatus both include a plurality of communication interfaces and can communicate using a plurality of communication paths simultaneously between the transmission node apparatus and the reception node apparatus.

Moreover, the communication system according to the present invention is characterized in that a means for changing, for each of the plurality of transmission interfaces in the transmission node apparatus, an aggregation of the reception interfaces addressable as destinations for data to be transferred to the reception node apparatus via the interface in order to maximize the communication performance when the plurality of communication paths are used simultaneously in response to a change in communication performance of each transmission interface and each reception interface.

In the communication system according to the present invention, the transmission node apparatus and the reception node apparatus both include the plurality of communication interfaces and can monitor a communication state of each communication interface in the transmission node apparatus and each communication interface in the reception node apparatus.

This monitor may be based on environment information such as radio wave intensity detected by the communication interface itself, for example, or may use a measurement means for a communication band of a link including a particular communication interface disclosed in PTL 3 (Japanese Unexamined Patent Application Publication No. 2008-294902).

On that basis, the present invention selects the aggregation of the reception interfaces to be the destination of the data communication for each transmission interface in order to optimize the state of data communication between target node apparatuses.

The performance of the path between specific communication interfaces cannot control both the transmission node apparatus and the reception node apparatus. Therefore, the present invention attempts optimal utilization of the communication resource of the communication interface mounted on the transmission node apparatus and the reception node apparatus by changing a transmission and reception pair itself, which is a combination of the transmission interface, a beginning of the path, and the reception interface, an end of the path, in order to realize the optimal performance.

The first exemplary embodiment of the present invention explains a case of incorporating the present invention into the communication system in which both the transmission node apparatus and the reception node apparatus are connected to different base stations generally, a plurality of wireless terminals with different communication systems are mounted, and the base stations are mutually connected by a wired high-speed communication network.

FIG. 1 is a block diagram showing a configuration example of the transmission node apparatus according to the first exemplary embodiment of the present invention. In FIG. 1, a transmission node apparatus 101 is composed including transmission interfaces 201-1 and 201-2, reception interfaces 202-4 and 202-5, a performance estimation process unit 203, a reception interface aggregate calculation unit 204, a multiplex transmission process unit 205, a multiplex reception process unit 206, an input and output terminal 207, a reception interface aggregation table 601, and a performance information table 602.

The data received through the input and output terminal 207 from an external process 103 is input to the multiplex transmission process unit 205 and transferred to the reception node apparatus via the transmission interface 201-1 or the transmission interface 201-2 according to the load balancing and jitter suppression control.

On the other hand, multiplex communication data and information of interface performance in an opposite direction from the reception node apparatus and the like is received via the reception interface 202-4 or the reception interface 202-5 and input to the multiplex reception process unit 206.

Further, the data to be transferred to the external process 103 is input to the input and output terminal 207 and performance information fed back is input to the performance estimation process unit 203. When the transmission interface 201 can monitor information regarding the performance of its own interface, the information is also transmitted to the performance estimation process unit 203.

The performance estimation process unit 203 performs performance estimation on the transmission interface and the reception interface in its own node apparatus from the input performance related information and stores the result to the performance information table 602.

The reception interface aggregate calculation unit 204 determines the aggregation of the reception interfaces to be the destination for each transmission interface according to the performance information of the interface held to the performance information table 602 so as to maximize the performance of the multiplex communication link and stores the result to the reception interface aggregation table 601.

At the time of data transmission, the multiplex transmission process unit 205 determines a pair of the transmission interface and the reception interface that is defined in the reception interface aggregation table 60 not only the transmission interface used for the transmission, and inputs data that specifies the reception interface into the transmission interface.

Note that when two-way communication is performed, the configuration of the transmission node apparatus 101 and the reception node apparatus is the same, and when the multiplex transmitted data is received, the multiplex reception process unit 206 performs a process for reshaping to be transferred to the downstream node apparatus.

Figure 2:
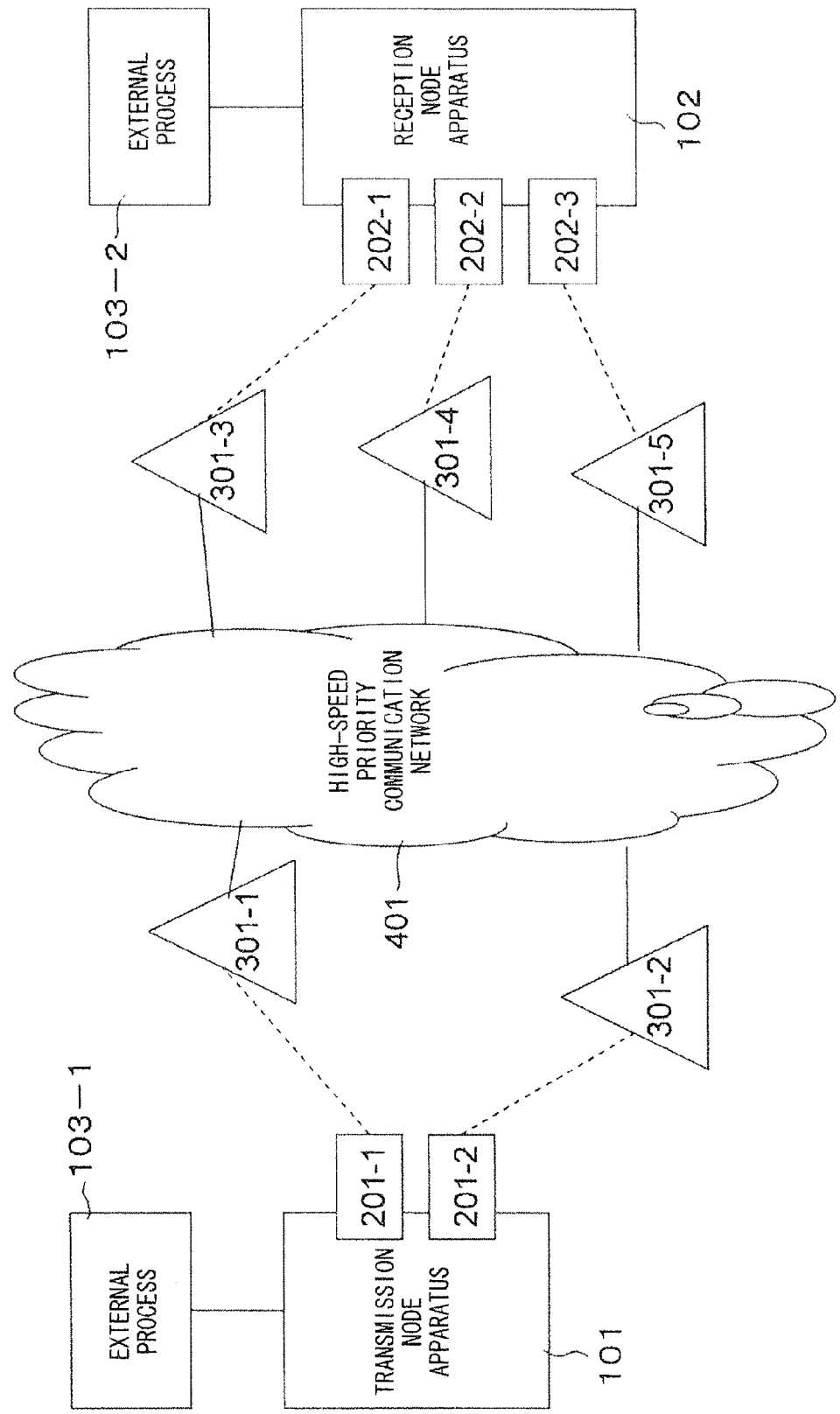
FIG. 2 is a block diagram showing a configuration example of a communication system according to the first exemplary embodiment of the present invention.

FIG. 2 is a block diagram showing a configuration example of the communication system according to the first exemplary embodiment of the present invention. In FIG. 2, the communication system according to the first exemplary embodiment of the present invention is composed of the transmission node apparatus 101, a reception node apparatus 102, transmission interfaces 201 (201-1 and 201-2), reception interfaces 202 (202-1 to 202-3), wireless base stations 301 (301-1 to 301-5), and a high-speed wired communication network 401. The transmission node apparatus 101 and reception node apparatus 102 perform mutual communication in order to transfer transmission data from an external process 103-1 to an external process 103-2, for example.

The configuration shown in FIG. 2 corresponds, for example, to the system that communicates between node apparatuses with a plurality of public wireless line terminals mounted thereon that can be connected to the Internet. In this case, respectively, the transmission node apparatus 101 and the reception node apparatus 102 correspond to the node apparatus with the plurality of public wireless line terminals mounted thereon, the transmission interface 201 and the reception interface 202 correspond to the public wireless terminal, the high-speed wired communication network 401 corresponds to the Internet, and the external process 103 corresponds to a user terminal that uses this system.

In this exemplary embodiment, the transmission node apparatus 101 and the reception node apparatus 102 shall perform the multiplex communication indicated in PTL 3 using a plurality of paths defined by a pair of the transmission interface 201 and the reception interface 202.

Figure 3:
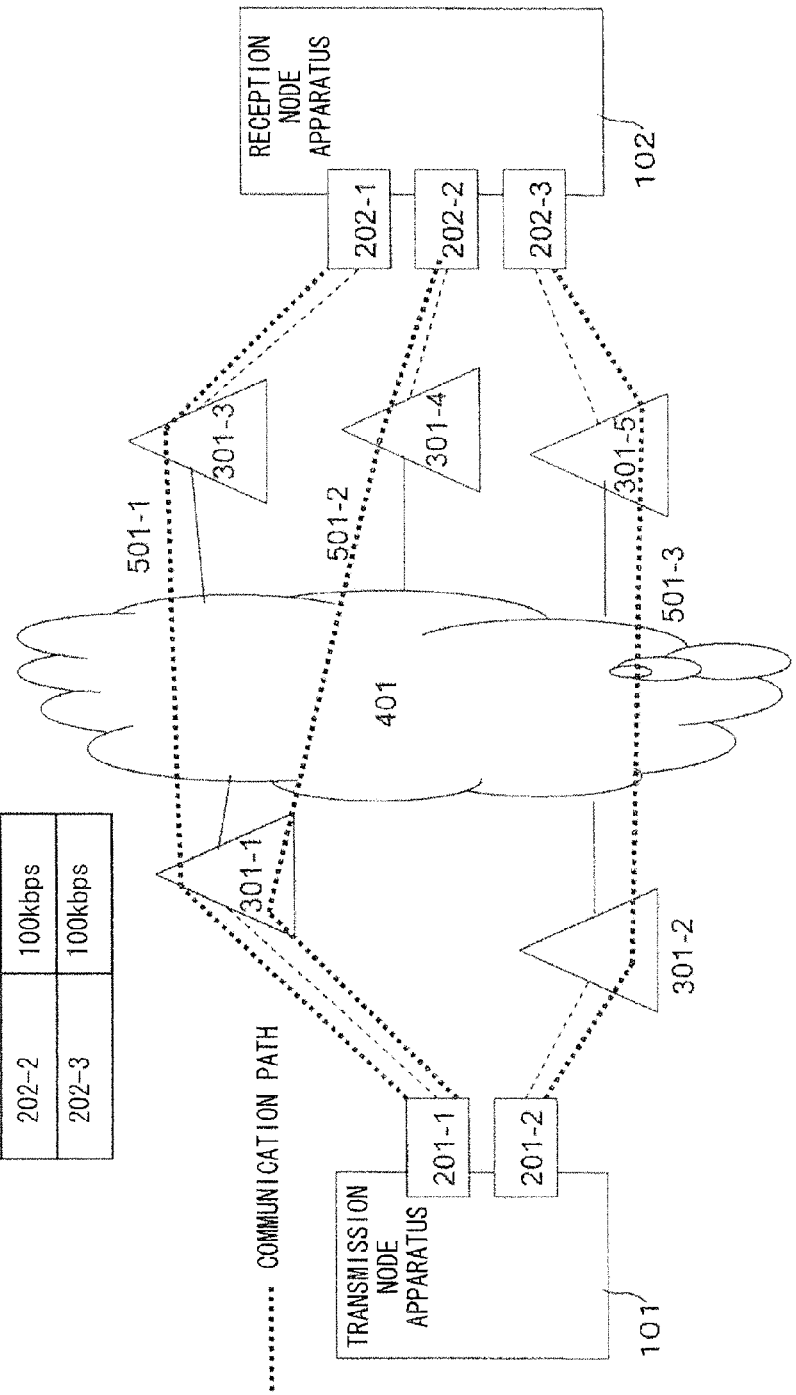
FIG. 3 is a view showing an operation example of the communication system according to the first exemplary embodiment of the present invention.
Figure 4:
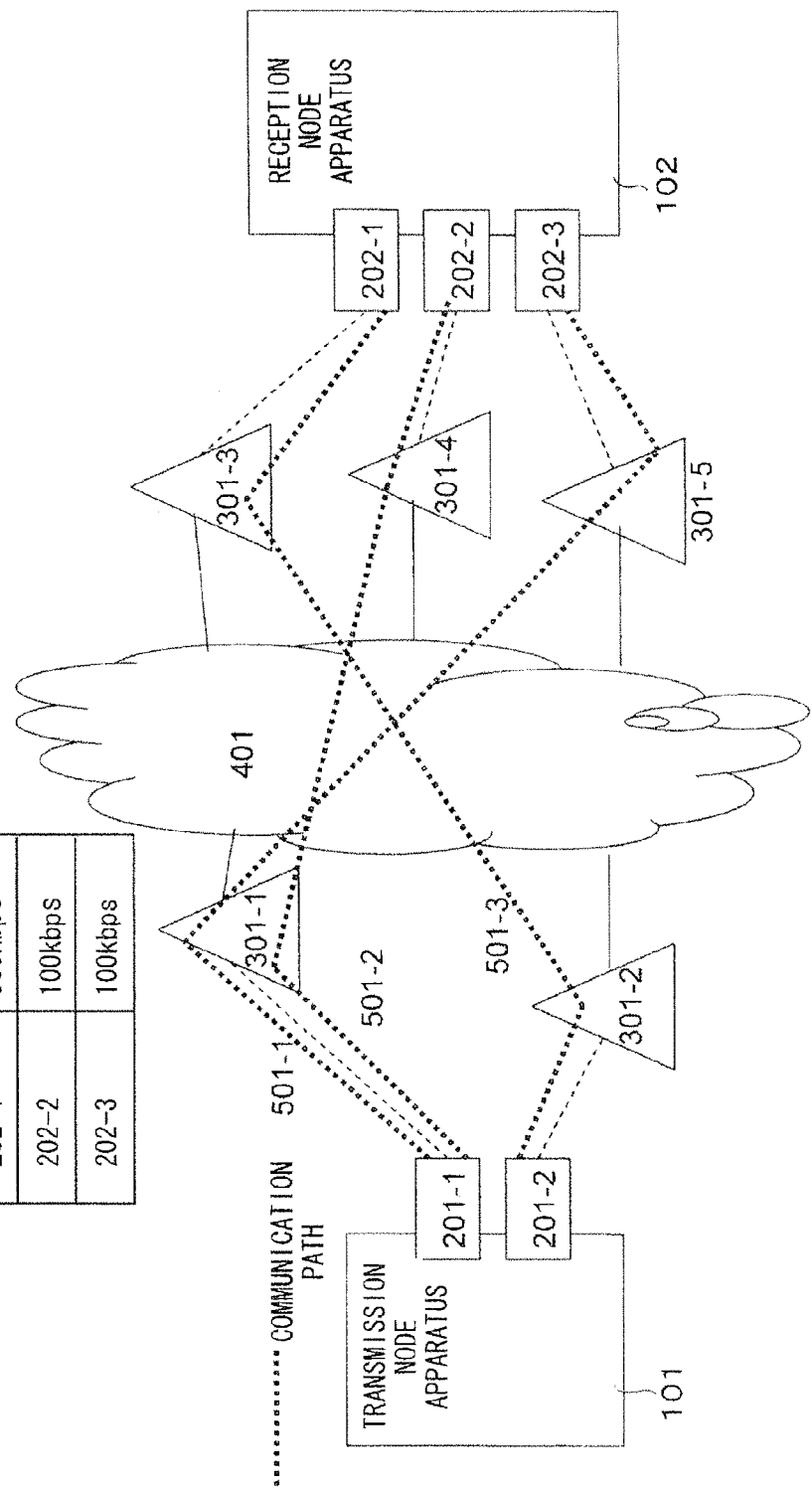
FIG. 4 is a view showing an operation example of the communication system according to the first exemplary embodiment of the present invention.
Figure 5:
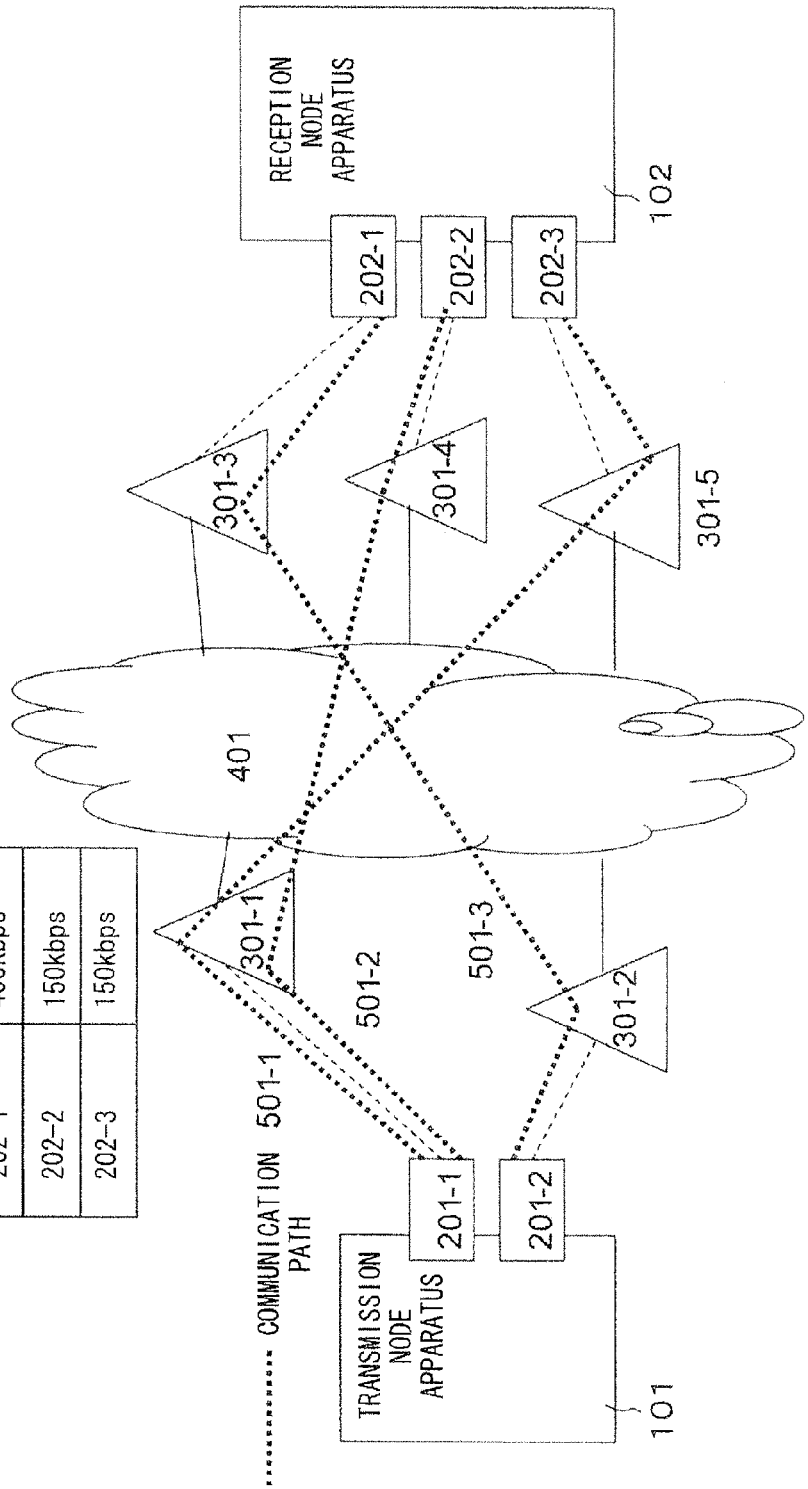
FIG. 5 is a view showing an operation example of the communication system according to the first exemplary embodiment of the present invention.

FIGS. 3 to 5 are views showing operation examples of the communication system according to the first exemplary embodiment of the present invention. First, an operation of the communication system according to this exemplary embodiment is explained using FIG. 3. The transmission node apparatus 101 here holds the estimated performance information of the transmission interface 201 in its own node apparatus 101 and the reception interface 202 in the reception node apparatus 102 to the performance information table 602.

The transmission node apparatus 101 obtains information on an available band and holds it to the performance information reference table 602. Moreover, the transmission node apparatus 101 corresponds to each transmission interface 201 and determines the aggregation of the destination reception interfaces 202 according to this information and holds it to the reception interface table 601.

In this example, the reception interface aggregation {202-1 and 202-2} corresponds to the transmission interface 201-1, and the reception interface aggregation {202-3} corresponds to the transmission interface 201-2, respectively.

As a result, as a communication path between the transmission node apparatus 101 and the reception node apparatus 102, a path 501-1 from the transmission interface 201-1 to the reception interface 202-1, a path 501-2 from the transmission interface 201-1 to the reception interface 202-2, and a path 501-3 from the transmission interface 201-2 to the reception interface 202-3 are respectively composed.

As described above, the destination reception interface 202 is determined because the band that can be used between the transmission node apparatus 101 and the reception node apparatus 102 is maximized. This is explained as follows.

A total value of the band for the reception interface 202 in the reception node apparatus 102 is 500 Kbps by adding 300 Kbps for the reception interface 202-1, 100 Kbps for the reception interface 202-2, and 100 Kbps for the reception interface 202-3. As the reception node apparatus 102 cannot receive more than this, 500 Kbps is an upper limit of the communication from the transmission node apparatus 101 to the reception node apparatus 102.

However, as the communication path 501-1 ends at the reception interface 202-1, the upper limit of the band to be transferred through the communication path 501-1 is 300 Kbps, which is the communication speed of the reception interface 202-1.

Similarly, the upper limit of the communication path 501-2 is 100 Kbps and that of the communication path 501-3 is 100 Kbps. From the reception interface table 601, although the communication path 501-1 and the communication path 501 start from the transmission interface 201-1, and a total upper limit of the transfer bands for these two is 400 Kbps. Since this value is smaller than the available band 500 Kbps for the transmission interface 201-1, even when the transmission interface 201-1 uses the communication path 501-1 and the communication path 501-2 simultaneously, it will not cause a bottleneck.

Similarly, when the transmission interface 201-2 uses the communication path 501-3, it will not cause a bottleneck. Accordingly, 500 Kbps, which is the upper limit of the communication band from the transmission node apparatus 101 to the reception node apparatus 102, can be achieved as the total communication band. However, this is assumed that even when the high-speed communication network 401 uses the communication paths 501-1, 501-2, and 501-3 all at the same time, it will not cause a bottleneck.

The transfer band equivalent to the upper limit of the communication band from the transmission node apparatus 101 to the reception node apparatus 102 cannot be achieved when the transmission node apparatus 101 selects a wrong correspondence of the aggregation of each transmission interface 201 and the reception interface 202.

Such an example is shown in FIG. 4. Although the available band of each communication interface is the same as that of the example in FIG. 3, the aggregation of the reception interfaces on the reception interface table 601 is different.

In this example, even when the transmission interface 201-1 uses the communication path 501-2 to the reception interface 202-2 and the communication path 501-1 to the reception interface 202-3 simultaneously, it will not cause a bottleneck. This is because that the available band for the transmission interface 201-1 is greater than 200 Kbps, which is the total upper limit of the total band of these two paths.

However, since the available band 100 Kbps for the transmission interface 201-2 is smaller than the available band 300 Kbps for the destination reception interface 202-1, it will cause a bottleneck. As a result, the communication band for the communication path 501-3 is 100 Kbps, which is equivalent to the available band for the transmission interface 201-2.

Accordingly, with the combination of the destination reception interface 202 shown in the reception interface table 501 in this example, the available total band is 300 Kbps, which is the total band of the communication paths 501-1, 501-2, and 501-3, and is smaller than the upper limit 500 Kbps that is the upper limit of the communication band from the transmission node apparatus 101 to the reception node apparatus 102.

However, the combination of the destination reception interface 202 shown in FIG. 4 is also optimal depending on the state of each interface. Such an example is shown in FIG. 5. For the available band for each communication interface shown on the performance information table 602 of FIG. 5, the combination of the transmission interface 201 and the reception interface 202 that is similar to FIG. 4, is optimal, and 700 Kbps, which is the upper limit of the transfer band from the transmission node apparatus 101 to the reception node apparatus 102 can be achieved.

When the reception interface aggregate calculation unit 204 in this exemplary embodiment detects the state shown in FIG. 4, for example, updating the reception interface aggregation table 601 as in FIG. 3 prevents reduction in the band utilization efficiency by path setting.

Although the calculation method of the reception interface aggregation table 601 can be any, when there are two transmission interfaces 201 and three reception interfaces 202 as in this exemplary embodiment, for example, there are eight ways of the aggregation of the reception interfaces 202 including an empty aggregation. Therefore, even when this is applied to each transmission interface 201, there is a total of 16 ways and a calculation method can be considered in which the total available band is evaluated for all of them to select the largest one.

In the first exemplary embodiment of the present invention mentioned above, although the transfer band from the transmission node apparatus 101 to the reception node apparatus 102 is to be optimized, this may be other performance indices or a combination of plurality of performance indices.

Figure 6:
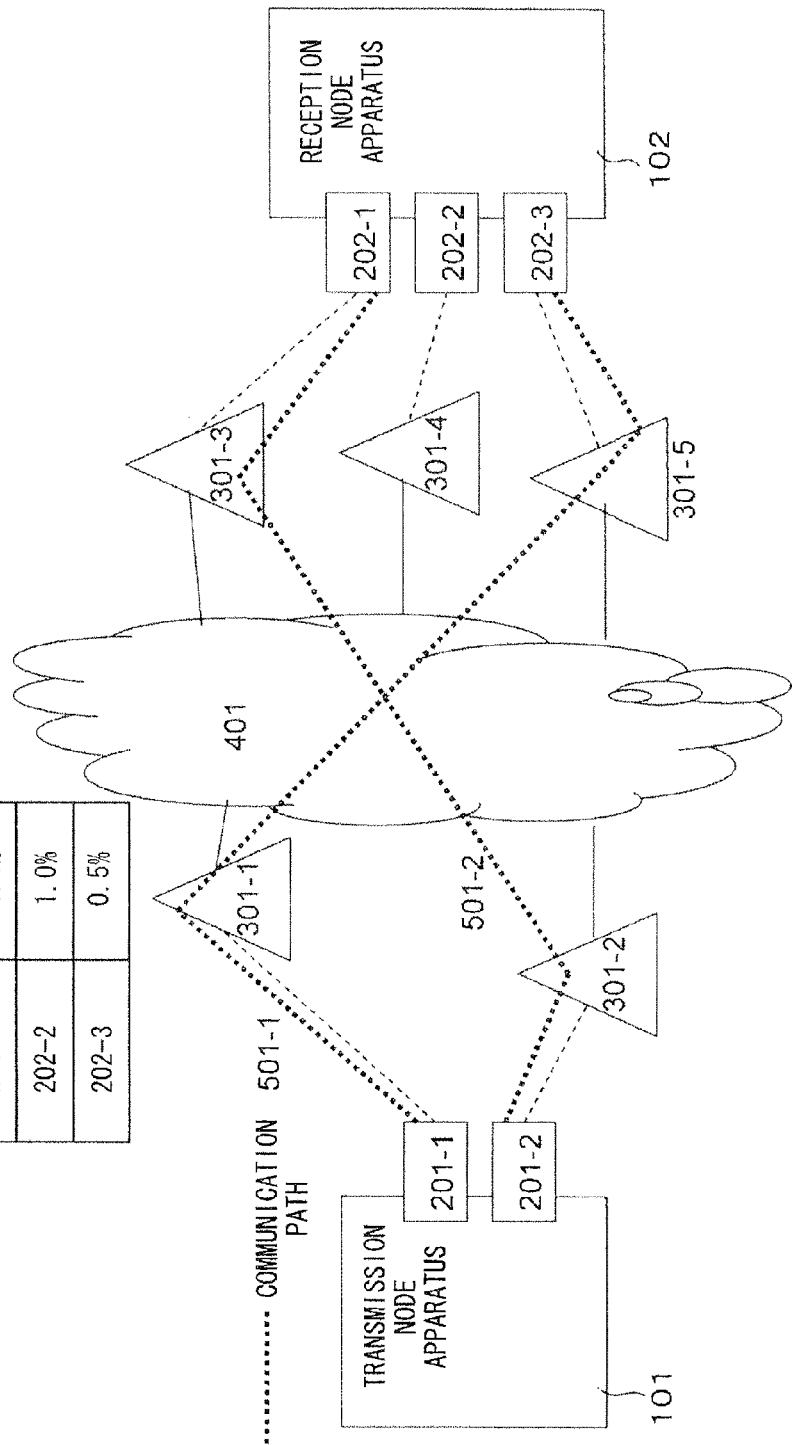
FIG. 6 is a view showing an operation example of a communication system according to a second exemplary embodiment of the present invention.

FIG. 6 is a view showing an operation example of the communication system according to a second exemplary embodiment of the present invention. An operation in the case that an optimizing target in the second exemplary embodiment of the present invention is a data loss rate is explained with reference to FIG. 6. In the second exemplary embodiment of the present invention, a multiplex communication process unit 208 of the transmission node apparatus 101 shall transmit the same data to the transmission interface 201-1 and the transmission interface 201-2 and performs redundancy communication that relieves a loss of the data transmitted from either one of the transmission interface by the other communication.

In this case, maximizing the effect of redundancy corresponds to minimizing the probability of losing both of the same data transmitted from both transmission interfaces. Note that in this exemplary embodiment, the performance information reference table 602 holds an estimated value of the loss rate in a wireless unit that has each interface as an end.

An assignment result of the aggregation of the reception interfaces 202 for each of the transmission interfaces 201 according to this exemplary embodiment is that the reception interface 202-3 for the transmission interface 201-1 and the reception interface 202-1 for the transmission interface 201-2. However, it is assumed that only one reception interface 202 can be assigned to each transmission interface 201 because of the band limitation to the transmission interface 201.

According to this selection result, the data loss rate of the communication path 501-1 is approximated to 1.0%, which is a sum of 0.5% for the transmission interface 201-1 and 0.5% for the reception interface 202-3.

On the other hand, in a similar manner as above, the data loss rate of the communication path 501-2 is approximated to 0.2%, which is a sum of 0.1% for the transmission interface 201-2 and 0.1% for the reception interface 202-1.

Then, the probability that the same data transmitted to the both of the communication path 501-1 and the communication path 502-2 is both lost is 0.002%, which is a product of the loss rate 1.0% for the communication path 501-1 and the loss rate 0.2% for the communication path 501-2.

For example, as another reception interface assignment, when the reception interface 202-1 is assigned to the transmission interface 201-1 and the reception interface 202-3 is assigned to the transmission interface 201-2, in a similar manner as above, the data loss rate transmitted from both the reception interfaces 201-1 and 201-2 is calculated as 0.0036%.

That is, even when the aggregation of the communication interfaces in the transmission node apparatus 101 and the reception node apparatus 102 to be used is the same, the loss rate changes depending on the correspondence between the transmission interface 201 and the reception interface 202. Thus, in this exemplary embodiment, the reception interface aggregate calculation unit 204 of the transmission node apparatus 101 dynamically determines the optimal correspondence between the transmission interface 201 and the reception interface 202 according to the estimation result of the loss rate for each interface that fluctuates over time.

While the abovementioned first and second exemplary embodiment of the present invention has a configuration in which both of the transmission interfaces transmit data to the reception interface via the high-speed wired communication network 401, a third exemplary embodiment of the present invention has a configuration including a transmission interface that can transmit data to the reception node apparatus without passing through the high-speed wired communication network 401.

FIG. 7 is a view showing an operation example of a communication system according to the third exemplary embodiment of the present invention. An operation of the communication system according to the third exemplary embodiment of the present invention is explained with reference to FIG. 7.

In the communication system according to the third exemplary embodiment of the present invention, the transmission interface 201-1 and the reception interfaces 202-1 and 202-2 shall be connected to the high-speed wired communication network 401, the transmission interface 201-2 and the reception interface 202-3 shall be connected to a communication network 402, and the high-speed wired communication network 401 and the communication network 402 shall be connected to each other.

In this case, all the transmission interfaces can communicate with any of the reception interfaces, and the first exemplary embodiment of the present invention can be applied thereto in order to optimize the communication speed of a multiplexed link, for example.

In this exemplary embodiment, communication continuity is to be optimized, and the performance information table 602 holds information on the independency of a fault in the communication network to which each interface is connected and other connection networks. The meaning of continuity is that an unexpected discontinuation in communication hardly occurs.

As this exemplary embodiment assumes that a communication failure between the high-speed wired communication network 401 and the communication network 402 is independent from each other, when a failure occurs in either of them, the possibility that a network failure in either of them influences the communication continuity can be reduced by configuring the communication path to be able to continue the communication.

In this case, the reception interface aggregate calculation unit 204 respectively relates the aggregation composed of the reception interfaces 202-1 and 202-2 to the transmission interface 201-1 and only the reception interface 202-3 to the transmission interface 201-2, as shown in the reception interface aggregation table 601.

This is the result of calculating the correspondence so that the data transmitted from the transmission interface 201-1 and the data transmitted from the transmission interface 201-2 will not pass through the nondependent high-speed wired communication network. Moreover, when the communication network to which each terminal is connected changes, the correspondence between the transmission interface and the reception interface is recalculated. This is generated when a public wireless terminal, such as a mobile phone, automatically roams the network.

Although, in the third exemplary embodiment of the present invention, the performance to be optimized is the communication continuity, the view of this exemplary embodiment can be generally applied to the optimization of the performance that is influenced by a phenomenon generated independently from the traversing communication network and the communication service. For example, in the multiplex communication, this exemplary embodiment can be applied to the purpose of minimizing the possibility of eavesdropping by a network administrator.

In the multiplex communication, even when a part of the communication path to be multiplexed is eavesdropped, the entire information cannot be reproduced, thus the administrator of any network cannot perform perfect eavesdropping unless all the communication paths pass through a single communication network.

Accordingly, this exemplary embodiment is used to manage the independency of eavesdropping generation mutually between the communication network to which each terminal is connected or connection services and relate the aggregation of the transmission interfaces and the reception interfaces so that the data transmitted from each transmission interface do not share an nondependent communication network or communication service, and thereby improving the safety against eavesdropping.

The whole or part of the exemplary embodiments disclosed above can be described as, but not limited to, the following supplementary notes.

[Supplementary Note 1]

A communication system that each of a transmission node apparatus and a reception node apparatus includes a plurality of communication interfaces and enables communication using a plurality of communication paths between the transmission node apparatus and the reception node apparatus, the transmission node apparatus comprising a means for changing an aggregation of reception interfaces addressable as destinations for data to be transferred to the reception node apparatus via each of a plurality of transmission interfaces so as to maximize performance of the communication using the plurality of communication paths simultaneously in response to a change in communication performance of each of the transmission interface and the reception interface, wherein the performance of the communication is a hand of multiplex communication that uses the plurality of communication paths in parallel.

[Supplementary Note 2]

A communication system that each of a transmission node apparatus and a reception node apparatus includes a plurality of communication interfaces and enables communication using a plurality of communication paths between the transmission node apparatus and the reception node apparatus, the transmission node apparatus comprising a means for changing an aggregation of reception interfaces addressable as destinations for data to be transferred to the reception node apparatus via each of a plurality of transmission interfaces so as to maximize performance of the communication using the plurality of communication paths simultaneously in response to a change in communication performance of each of the transmission interface and the reception interface, wherein the performance of the communication is a size of a loss rate of redundancy communication that transfers same data via the plurality of communication paths.

[Supplementary Note 3]

A communication system that each of a transmission node apparatus and a reception node apparatus includes a plurality of communication interfaces and enables communication using a plurality of communication paths between the transmission node apparatus and the reception node apparatus, the transmission node apparatus comprising a means for changing an aggregation of reception interfaces addressable as destinations for data to be transferred to the reception node apparatus via each of a plurality of transmission interfaces so as to maximize performance of the communication using the plurality of communication paths simultaneously in response to a change in communication performance of each of the transmission interface and the reception interface, wherein the performance of the communication is continuity of multiplex communication that uses the plurality of communication paths in parallel, and the communication performance of each of the transmission interface and the reception interface is independency of a failure generation phenomenon mutually between a communication network to be connected or a communication service.

[Supplementary Note 4]

A communication system that each of a transmission node apparatus and a reception node apparatus includes a plurality of communication interfaces and enables communication using a plurality of communication paths between the transmission node apparatus and the reception node apparatus, the transmission node apparatus comprising a means for changing an aggregation of reception interfaces addressable as destinations for data to be transferred to the reception node apparatus via each of a plurality of transmission interfaces so as to maximize performance of the communication using the plurality of communication paths simultaneously in response to a change in communication performance of each of the transmission interface and the reception interface, wherein the performance of the communication is eavesdropping resistance of secret information transmitted dispersedly through the plurality of communication paths, and the communication performance of each of the transmission interface and the reception interface is independency of an eavesdropping generation phenomenon mutually between a communication network to be connected or a communication service.

[Supplementary Note 5]

A method for selecting a destination reception interface that is used for a communication system in which each of a transmission node apparatus and a reception node apparatus includes a plurality of communication interfaces and enables communication using a plurality of communication paths simultaneously between the transmission node apparatus and the reception node apparatus, the method for selecting the destination reception interface comprising executing by the transmission node apparatus a process for changing an aggregation of reception interfaces addressable as destinations for data to be transferred to the reception node apparatus via each of the plurality of transmission interfaces so as to maximize performance of the communication using the plurality of communication paths simultaneously in response to a change in communication performance of each of the transmission interface and the reception interface, wherein the performance of the communication is a band of multiplex communication that uses the plurality of communication paths in parallel.

[Supplementary Note 6]

A method for selecting a destination reception interface that is used for a communication system in which each of a transmission node apparatus and a reception node apparatus includes a plurality of communication interfaces and enables communication using a plurality of communication paths simultaneously between the transmission node apparatus and the reception node apparatus, the method for selecting the destination reception interface comprising executing by the transmission node apparatus a process for changing an aggregation of reception interfaces addressable as destinations for data to be transferred to the reception node apparatus via each of the plurality of transmission interfaces so as to maximize performance of the communication using the plurality of communication paths simultaneously in response to a change in communication performance of each of the transmission interface and the reception interface, wherein the performance of the communication is a size of a loss rate of redundancy communication that transfers same data via the plurality of communication paths.

[Supplementary Note 7]

A method for selecting a destination reception interface that is used for a communication system in which each of a transmission node apparatus and a reception node apparatus includes a plurality of communication interfaces and enables communication using a plurality of communication paths simultaneously between the transmission node apparatus and the reception node apparatus, the method for selecting the destination reception interface comprising executing by the transmission node apparatus a process for changing an aggregation of reception interfaces addressable as destinations for data to be transferred to the reception node apparatus via each of the plurality of transmission interfaces so as to maximize performance of the communication using the plurality of communication paths simultaneously in response to a change in communication performance of each of the transmission interface and the reception interface, wherein the performance of the communication is continuity of multiplex communication that uses the plurality of communication paths in parallel, and the communication performance of each of the transmission interface and the reception interface is independency of a failure generation phenomenon mutually between a communication network to be connected or a communication service.

[Supplementary Note 8]

A method for selecting a destination reception interface that is used for a communication system in which each of a transmission node apparatus and a reception node apparatus includes a plurality of communication interfaces and enables communication using a plurality of communication paths simultaneously between the transmission node apparatus and the reception node apparatus, the method for selecting the destination reception interface comprising executing by the transmission node apparatus a process for changing an aggregation of reception interfaces addressable as destinations for data to be transferred to the reception node apparatus via each of the plurality of transmission interfaces so as to maximize performance of the communication using the plurality of communication paths simultaneously in response to a change in communication performance of each of the transmission interface and the reception interface, wherein the performance of the communication is eavesdropping resistance of secret information transmitted dispersedly through the plurality of communication paths, and the communication performance of each of the transmission interface and the reception interface is independency of an eavesdropping generation phenomenon mutually between a communication network to be connected or a communication service.

[Supplementary Note 9]

A method for selecting a destination reception interface used for a communication node apparatus that includes a plurality of communication interfaces and enables communication using a plurality of communication paths simultaneously with an opposing apparatus, the method for selecting the destination reception interface comprising executing by the communication node apparatus a process for changing an aggregation of reception interfaces addressable as destinations for data to be transferred to the opposing apparatus via each of the plurality of transmission interfaces so as to maximize performance of the communication using the plurality of communication paths simultaneously in response to a change in communication performance of each of the transmission interface and the reception interface, wherein the performance of the communication is a band of multiplex communication that uses the plurality of communication paths in parallel.

[Supplementary Note 10]

A method for selecting a destination reception interface used for a communication node apparatus that includes a plurality of communication interfaces and enables communication using a plurality of communication paths simultaneously with an opposing apparatus, the method for selecting the destination reception interface comprising executing by the communication node apparatus a process for changing an aggregation of reception interfaces addressable as destinations for data to be transferred to the opposing apparatus via each of the plurality of transmission interfaces so as to maximize performance of the communication using the plurality of communication paths simultaneously in response to a change in communication performance of each of the transmission interface and the reception interface, wherein the performance of the communication is a size of a loss rate of redundancy communication that transfers same data via the plurality of communication paths.

[Supplementary Note 11]

A method for selecting a destination reception interface used for a communication node apparatus that includes a plurality of communication interfaces and enables communication using a plurality of communication paths simultaneously with an opposing apparatus, the method for selecting the destination reception interface comprising executing by the communication node apparatus a process for changing an aggregation of reception interfaces addressable as destinations for data to be transferred to the opposing apparatus via each of the plurality of transmission interfaces so as to maximize performance of the communication using the plurality of communication paths simultaneously in response to a change in communication performance of each of the transmission interface and the reception interface, wherein the performance of the communication is continuity of multiplex communication that uses the plurality of communication paths in parallel, and the communication performance of each of the transmission interface and the reception interface is independency of a failure generation phenomenon mutually between a communication network to be connected or a communication service.

[Supplementary Note 12]

A method for selecting a destination reception interface used for a communication node apparatus that includes a plurality of communication interfaces and enables communication using a plurality of communication paths simultaneously with an opposing apparatus, the method for selecting the destination reception interface comprising executing by the communication node apparatus a process for changing an aggregation of reception interfaces addressable as destinations for data to be transferred to the opposing apparatus via each of the plurality of transmission interfaces so as to maximize performance of the communication using the plurality of communication paths simultaneously in response to a change in communication performance of each of the transmission interface and the reception interface, wherein the performance of the communication is eavesdropping resistance of secret information transmitted dispersedly through the plurality of communication paths, and the communication performance of each of the transmission interface and the reception interface is independency of an eavesdropping generation phenomenon mutually between a communication network to be connected or a communication service.

Although the present invention is explained with reference to the exemplary embodiments, the present invention is not limited by above. Various modifications that can be understood by those skilled in the art can be made to the configurations and details of the present invention within the scope of the present invention.

REFERENCE SIGNS LIST

101 Transmission Node Apparatus
102 Reception Node Apparatus
103, 103-1, and 103-2 External Process
201-1,201-2 Transmission Interface
202-1 to 202-5 Reception Interface
203 Performance Estimation Process Unit
204 Reception Interface Aggregate Calculation Unit
205 Multiplex Transmission Process Unit
206 Multiplex Reception Process Unit
207 Input And Output Terminal
301 and 301-1 to 301-5 Wireless Base Station
401 High-Speed Wired Communication Network
501-1 to 501-3 Communication Path
601 Reception Interface Aggregation Table
602 Performance Information Table

The invention claimed is:

1. A communication node apparatus that includes a plurality of communication interfaces and enables communication using a plurality of communication paths simultaneously with an opposing apparatus, the communication node apparatus comprising a multiplex transmission process unit that changes an aggregation of reception interfaces addressable as destinations for data to be transferred to the opposing apparatus via each of a plurality of transmission interfaces so as to maximize performance of the communication using the plurality of communication paths simultaneously in response to a change in communication performance of each of the transmission interfaces and the reception interfaces.

2. The communication node apparatus according to claim 1, wherein the performance of the communication is a band of multiplex communication that uses the plurality of communication paths in parallel.

3. The communication node apparatus according to claim 1, wherein the performance of the communication is a size of a loss rate of redundancy communication that transfers same data via the plurality of communication paths.

4. The communication node apparatus according to claim 1, wherein the performance of the communication is continuity of multiplex communication that uses the plurality of communication paths in parallel, and the communication performance of each of the transmission interfaces and the reception interfaces is independency of a failure generation phenomenon mutually between a communication network to be connected or a communication service.

5. The communication node apparatus according to claim 1, wherein the performance of the communication is eavesdropping resistance of secret information transmitted dispersedly through the plurality of communication paths, and the communication performance of each of the transmission interfaces and the reception interfaces is independency of an eavesdropping generation phenomenon mutually between a communication network to be connected or a communication service.

6. A communication system in which each of a transmission node apparatus and a reception node apparatus includes a plurality of communication interfaces and enables communication using a plurality of communication paths between the transmission node apparatus and the reception node apparatus, the transmission node apparatus comprising a multiplex transmission process unit that changes an aggregation of reception interfaces addressable as destinations for data to be transferred to the reception node apparatus via each of a plurality of transmission interfaces so as to maximize performance of the communication using the plurality of communication paths simultaneously in response to a change in communication performance of each of the transmission interfaces and the reception interfaces.

7. A method for selecting a destination reception interface that is used for a communication system in which each of a transmission node apparatus and a reception node apparatus includes a plurality of communication interfaces and enables communication using a plurality of communication paths simultaneously between the transmission node apparatus and the reception node apparatus, the method for selecting the destination reception interface comprising executing by the transmission node apparatus a process for changing an aggregation of reception interfaces addressable as destinations for data to be transferred to the reception node apparatus via each of a plurality of transmission interfaces so as to maximize performance of the communication using the plurality of communication paths simultaneously in response to a change in communication performance of each of the transmission interfaces and the reception interfaces.

8. A method for selecting a destination reception interface used for a communication node apparatus that includes a plurality of communication interfaces and enables communication using a plurality of communication paths simultaneously with an opposing apparatus, the method for selecting the destination reception interface comprising executing by the communication node apparatus a process for changing an aggregation of reception interfaces addressable as destinations for data to be transferred to the opposing apparatus via each of a plurality of transmission interfaces so as to maximize performance of the communication using the plurality of communication paths simultaneously in response to a change in communication performance of each of the transmission interfaces and the reception interfaces.

* * * * *